3,278,579
MALONIC ACID ESTER ADDUCTS OF DECA-
CHLOROOCTAHYDRO-1,3,4-METHENO - 2H-
CYCLOBUTA (cd)PENTALEN-2-ONE
Everett E. Gilbert, Morris Township, Morris County, and
Pasquale Lombardo, East Hanover Township, Morris
County, N.J., assignors to Allied Chemical Corporation,
New York, N.Y., a corporation of New York
No Drawing. Filed Jan. 30, 1963, Ser. No. 255,097
11 Claims. (Cl. 260—468)

This invention relates to new adducts prepared from the ketone, decachlorooctahydro-1,3,4-metheno-2H-cyclobuta (cd) pentalen-2-one, to new pesticidal compositions containing adducts of said ketone and to a method of combatting pests, especially insects, with these new pesticidal compositions.

Decachlorooctahydro-1,3,4-metheno-2H-cyclobuta (cd) pentalen-2-one, hereafter referred to as "ketone," is a complex chlorinated polycyclic ketone having the molecular formula $C_{10}Cl_{10}O$ and a molecular weight of 490.68. It is believed to be most accurately represented by the following cage structural formula:

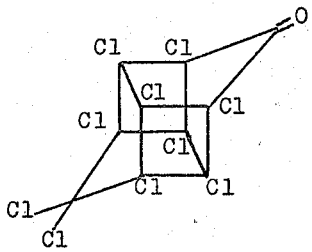

This ketone may be prepared in known manner by hydrolyzing the reaction product of hexachlorocyclopentadiene and sulfur trioxide.

An object of the present invention is to provide new ketone-malonate adducts exhibiting high pesticidal activity.

Another object of the invention is to provide new pesticidal compositions containing the ketone-malonate adducts as active ingredients.

Still another object of the invention is to provide a method of combatting pests, especially insects, comprising contacting the pests with pesticidal compositions containing the ketone-malonate adducts as active ingredients.

It is a further object of the invention to provide a simple and economical method for preparing the ketone-malonate adducts.

Other objects and advantages of the invention will be apparent from the following description.

The ketone-malonate adducts contemplated by this invention comprise those obtained by reacting the ketone with a malonate ester of the group consisting of dialkyl malonates and diaryl malonates. The reaction may be represented by the following equation:

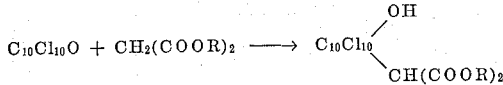

In the equation, R is an alkyl group, preferably an alkyl group containing 1 to 12 carbon atoms, or an aryl group, preferably phenyl. Any dialkyl or diaryl malonate may be used to react with the ketone. Typical malonates include dimethyl, diethyl, dipropyl, di(n-butyl), di(n-hexyl), di(n-dodecyl), diphenyl and dinaphthyl malonates.

The ketone-malonate adducts may be prepared in simple and economical manner by reacting the ketone with the desired malonate, in mol ratio of about 0.5 to 2 mols of ketone per mol of malonate, at temperature ranging from room temperature to about 250° C.

If the ketone is available in hydrate form, it can be dehydrated before reaction by heating it in an oven at temperature of about 135° to 150° C. or by refluxing it with an aromatic solvent such as xylene to remove the water. The water can also be removed during reaction, as described below.

Although the reactants may be employed in mol ratio of about 0.5 to 2 mols of ketone per mol of malonate, it is preferred to use approximately equimolar proportions of the reactants.

The reaction is carried out at room temperature to about 250° C., usually at temperature of about 100° to 200° C. The reaction temperature is preferably the reflux temperature of the reaction mixture.

If desired, the reaction may be carried out in the presence of an organic solvent. The solvent must be inert to the reactants and the desired ketone-malonate adduct. Among the suitable solvents are aliphatic or aromatic hydrocarbons such as xylene, toluene, benzene, petroleum ether, methylene chloride, etc. The solvent serves to keep the ketone-malonate adduct in solution. Moreover, if the ketone is employed in hydrate form, the solvent enables dehydration of the ketone during the reaction.

Conventional acid or basic catalysts may be employed to speed up the reaction. It is, however, a feature of this invention that the reaction proceeds readily in the absence of a catalyst.

The ketone-malonate adducts may be recovered from the reaction mixture by procedures known in the art, as by precipitation with a non-solvent, e.g. hexane, followed by filtration and drying. The adducts may be purified, for example, by recrystallization from hexane.

The following examples are typical of preparation of the ketone-malonate adducts of this invention. In the examples, parts are by weight.

*Example 1*

56 parts of ketone hydrate (4 mols water) were refluxed with 215 parts of xylene to effect dehydration of the hydrate by azeotropic distillation. 16 parts of diethyl malonate were added, and the mixture was refluxed overnight. The mixture was then distilled in vacuo to remove solvent, thereby leaving an oil as residue. The oil was triturated with 66 parts of hexane to produce a solid which was filtered off and washed with hexane. 32 parts of ketone-diethyl malonate adduct (50% yield) were obtained.

The product had a melting point of 106–110° C. The infrared spectrum of the product exhibited hydroxyl absorption at 2.92 microns and carbonyl absorption at 5.78, 5.85 microns.

*Example 2*

56 parts of ketone hydrate (4 mols water) were refluxed with 210 parts of xylene to effect dehydration of the hydrate by azeotropic distillation. 13 parts of dimethyl malonate were added to the xylene solution, and the mixture was refluxed at 140° C. for 17 hours. The mixture was then cooled, filtered and distilled in vacuo to remove solvent. A solid resulted which was triturated with hexane, filtered off, washed with hexane and dried to yield 49 parts (78% yield) of ketone-dimethyl malonate adduct.

A portion of the product (10 grams) was purified by dissolving it in hot hexane-methylene chloride mixture, treating the solution with decolorizing charcoal, filtering, evaporating to 150 ml. and allowing the residue to crystallize.

The purified product had a melting point of 153–154° C. Chlorine analysis of the purified product gave 56.6% (56.9% theory). The infrared spectrum of the product showed hydroxyl absorption at 2.88 microns, carbon-hydrogen absorption at 3.26, 3.33 microns, carbonyl absorption at 5.63, 5.74 microns and carbon-hydrogen absorption at 6.94, 7.07 microns.

*Example 3*

16 parts of ketone hydrate (4 mols water) were refluxed with 181 parts of xylene to effect dehydration of the hydrate by azeotropic distillation. 25.6 parts of diphenyl malonate were added to the solution, and the mixture was refluxed overnight. After filtering, the mixture was stripped of solvent by distillation in vacuo to produce a solid. The solid was dissolved in methylene chloride-hexane mixture. Most of the methylene chloride was distilled off, and the precipitated solid was then removed by filtration. 17 parts (76% yield) of ketone-diphenyl malonate adduct were obtained.

A portion of the product (5 grams) was purified by dissolving it in hot hexane-methylene chloride mixture, treating the solution with decolorizing charcoal, filtering, evaporating to a volume of about 100 ml. and allowing the residue to crystallize (after seeding). After two recrystallizations from benzene-hexane mixtures, the product had a melting point of 164.5–165.5° C. The infrared spectrum of the product showed hydroxyl absorption at 2.87 microns, carbon-hydrogen absorption at 3.25 microns, carbonyl absorption at 5.60, 5.69 microns and aromatic absorption at 6.27, 6.68, 6.75 microns.

*Example 4*

39 parts of ketone hydrate (4 mols water) were refluxed with 210 parts of xylene to effect dehydration of the hydrate by azeotropic distillation. 15 parts of di(n-butyl) malonate were added to the solution, and the mixture was refluxed overnight. The mixture was then stripped in vacuo to yield a viscous oil. The oil was dissolved in hexane, and the solution was cooled in Dry Ice-acetone. An oily solid precipitated and was allowed to warm to room temperature. The precipitate was then filtered and washed with hexane to produce 7 parts of solid having a melting point of 67–71° C. A solid precipitated in the filtrate and was filtered off and washed with hexane to produce 4 parts of solid having a melting point of 68–70° C. The resulting filtrate was cooled in Dry Ice-acetone to precipitate 20 parts of solid having a melting point of 84–87° C. The infrared spectrum of the 3 crops showed them to be essentially identical ketone-di(n-butyl)malonate adducts. They exhibited hydroxyl absorption at 2.92 microns and carbonyl absorption at 5.70, 5.78 microns.

*Example 5*

41.5 parts of ketone hydrate (4 mols water) were reacted with 20 parts of di(n-hexyl)malonate by refluxing overnight. Solvent was removed by distillation in vacuo to yield 57 parts of viscous dark oil comprising ketone-di(n-hexyl)malonate adduct.

The infrared spectrum of the product showed hydroxyl absorption at 2.90 microns and carbonyl absorption at 5.68, 5.78 microns.

*Example 6*

28 parts of ketone hydrate (4 mols water) and 22 parts of di(n-dodecyl)malonate were reacted by refluxing overnight. Solvent was then removed by distillation in vacuo to yield 42 parts of a viscous dark oil comprising ketone-di(n-dodecyl)malonate adduct.

The infrared spectrum of the product showed hydroxyl absorption at 2.91 microns and carbonyl absorption at 5.68, 5.78 microns.

The ketone-malonate adducts of this invention may be applied to pests., especially insects, "as is" but are advantageously incorporated as ingredients in suitable liquid or solid carriers to provide pesticidal spray or dust compositions.

The liquid pesticidal compositions generally contain in proportions by weight about 10 to 25% of the adduct as active ingredient, about 65 to 88% of an aromatic solvent and about 2 to 10% of a suitable wetting or emulsifying agent, such as diglycol oleate, p-isooctyl phenyl ether of polyethylene glycol, blends of alkyl aryl polyether alcohols with alkyl aryl sulfonates and blends of polyoxyethylene sorbitan esters of mixed fatty and resin acids with alkyl aryl sulfonates. The resulting concentrate solution is diluted or admixed with water to form an aqueous dispersion or emulsion suitable for spray application containing about 0.001 to 0.1% by weight of active ingredient.

Representative aromatic solvents which may be used in preparing the liquid pesticidal compositions include xylene, high aromatic solvents, methylated naphthalenes, heavy aromatic naphtha, etc.

The wettable powder compositions generally contain in proportions by weight about 25 to 75% of the active ingredient, about 20 to 73% of a finely divided solid carrier and about 2 to 5% of suitable wetting and dispersing agents. Typical wetting agents include polyether sulfonates, alkyl aryl sulfonates, etc. Typical dispersing agents include ligninsulfonates, naphthalene sulfonic acid-formaldehyde condensates, etc.

The wettable powder compositions can readily be prepared by mixing or milling the active ingredient with the carrier and wetting agent to a typical particle size of from about 3 to 40 microns. The composition is admixed with water to form an aqueous dispersion suitable for spraying containing about 0.001 to 0.1% by weight of active ingredient.

Representative solid carriers which may be used in preparing the wettable powders include magnesium and aluminum silicates (talc, kaolin clays, attapulgite clays, etc.), carbonates (dolomite, chalk, etc.), materials containing silicic acid (diatomaceous earth), fuller's earth, gypsum, sulfur, etc.

The dosage of the active ingredient depends on the particular organisms to be controlled, field conditions, etc., as known in the art. In any event, sufficient quantity of the active ingredient is used to provide the desired toxicity.

Exemplary tests of the ketone-malonate adducts of the present invention are set forth below:

| Active Ingredient | Formulation | Percent Kill | |
|---|---|---|---|
| | | Mexican Bean Beetle Larvae | Southern Armyworms |
| Ketone-diethyl malonate adduct | 8 pounds 25% wettable powder composition* per 100 gallons water | 100 | 100 |
| Ketone-dimethyl malonate adduct | 2 pounds adduct per 100 gallons acetone-water solution (1:1) | 100 | 100 |
| Ketone-diphenyl malonate adduct | 8 pounds 25% wettable powder composition* per 100 gallons water | 60 | 100 |
| Ketone-di(n-butyl)malonate adduct | 8 pounds 25% wettable powder composition* per 100 gallons water | 100 | 100 |
| Ketone-di(n-hexyl)malonate adduct | 8 pounds 25% wettable powder composition* per 100 gallons water | 100 | 100 |
| Ketone-di(n-dodecyl)malonate adduct | 8 pounds 25% wettable powder composition* per 100 gallons water | 80 | 100 |

*25.0% active ingredient, 73.5% "Attaclay" (attapulgite clay carrier), 0.75% "Elvanol" 51-05 (water-soluble synthetic polyvinyl alcohol dispersing agent), 0.75% "Nacconol SW" (alkyl aryl sulfonate wetting agent).

The tests on toxicity to Mexican bean beetle larvae (*Epilachna varivestis*) were carried out by spraying horticultural (cranberry) bean plants with the indicated formulation and allowing the plants to dry. The larvae were confined to the treated foliage by means of wire cages. Record of kill was made 3 days after treatment.

The tests on Southern armyworms (*Prodenia eridania*)

were carried out by spraying horticultural (cranberry) bean plants with the indicated formulation and allowing the plants to dry. The armyworms were confined to the treated foliage by means of wire cages. Mortality count was made three days after treatment.

The adducts also showed high effectiveness (96–100% kill) in tests on houseflies (*Musca domestica*).

Since various changes and modifications may be made in this invention without departing from the spirit thereof, the invention is deemed to be limited only by the scope of the appended claims.

We claim:
1. Ketone malonate adducts having the following formula:

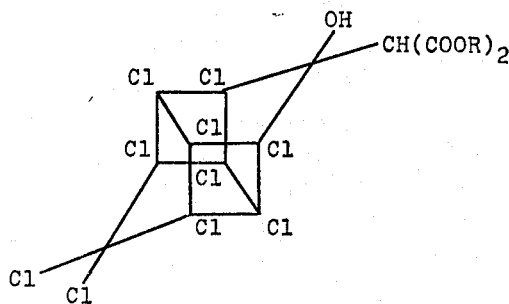

wherein R is an alkyl or aryl group.

2. Ketone-malonate adducts of claim 1 wherein R is an alkyl group containing from 1 to 12 carbon atoms.

3. Ketone-malonate adducts of claim 1 wherein R is an aryl group.

4. A ketone-malonate adduct of claim 1 wherein R is ethyl.

5. A ketone-malonate adduct of claim 1 wherein R is methyl.

6. A ketone-malonate adduct of claim 1 wherein R is n-butyl.

7. A ketone-malonate adduct of claim 1 wherein R is n-hexyl.

8. A ketone-malonate adduct of claim 1 wherein R is n-dodecyl.

9. A process which comprises reacting decachlorooctahydro-1,3,4-metheno-2H-cyclobuta (cd) pentalen-2-one with a member of the group consisting of dialkyl and diaryl malonates, in mol ratio of about 0.5 to 2 mols decachlorooctahydro-1,3,4-metheno-2H-cyclobuta (cd) pentalen-2-one per mol of malonate, at temperature ranging from room temperature to about 250° C.

10. The process of claim 9 in which the reaction is carried out in the presence of an inert organic solvent.

11. A process which comprises reacting approximately equimolar proportions of decachlorooctahydro-1,3,4-metheno-2H-cyclobuta (cd) pentalen-2-one and a member of the group consisting fo dialkyl and diaryl malonates at temperature of about 100° to 200° C. in the presence of an inert organic solvent.

References Cited by the Examiner

UNITED STATES PATENTS

| | | | |
|---|---|---|---|
| 2,516,404 | 7/1950 | McBee et al. | 260—503 |
| 2,616,825 | 11/1952 | Gilbert et al. | 260—586 X |
| 2,616,928 | 11/1952 | Gilbert et al. | 260—586 |
| 2,702,305 | 2/1955 | Gilbert et al. | 260—648 |
| 2,761,805 | 9/1956 | Huidobro et al. | 167—30 |
| 2,773,799 | 12/1956 | Yun Fan | 167—30 |
| 2,864,680 | 12/1958 | Degginger | 71—2.3 |
| 2,882,320 | 4/1959 | Cheney et al. | 260—586 |
| 2,883,320 | 4/1959 | Nickell | 167—30 |
| 2,898,375 | 8/1959 | Guex et al. | 260—586 |
| 3,055,948 | 9/1962 | Hoch et al. | 260—611 |

LORRAINE A. WEINBERGER, *Primary Examiner.*

JULIAN S. LEVITT, *Examiner.*

G. A. MENTIS, R. K. JACKSON, *Assistant Examiners.*